United States Patent
Bays

[11] 3,755,319
[45] Aug. 28, 1973

[54] XANTHONE DERIVATIVES
[75] Inventor: David Edmund Bays, London, England
[73] Assignee: Allen & Hanburys Limited, London, England
[22] Filed: Mar. 8, 1972
[21] Appl. No.: 232,954

Related U.S. Application Data
[62] Division of Ser. No. 90,444, Nov. 17, 1970.

[30] Foreign Application Priority Data
Nov. 27, 1969   Great Britain .......................... 58121

[52] U.S. Cl. 260/247.5 R, 260/247.1, 260/247.2 B, 260/308 D, 424/248, 424/269
[51] Int. Cl. ............................................. C07d 99/04
[58] Field of Search ........................ 260/308 D, 335

[56] References Cited
OTHER PUBLICATIONS
El-Abbady et al., Chem. Abstracts, Vol. 54, Cols. 22614-22615(1960) QD1A51.

Primary Examiner—Alton D. Rollins
Attorney—Bacon & Thomas

[57] ABSTRACT
Xanthone derivatives of the formula:

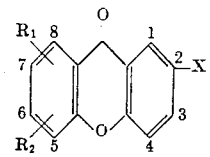

in which X represents a carboxyl or 5-[1H]-tetrazolyl group; and $R_1$ and $R_2$ which may be the same or different each represent a hydrogen atom, an alkyl group containing from 1 to 4 carbon atoms, a nitro group, a halogen atom or a group of the formula $-NR_3R_4$ or $OR_3$ or $NR_5SO_2R_6$, (in which the groups $R_3$ and $R_4$ which may be the same or different each represent a hydrogen atom, a phenyl group, a benzyl group or an alkyl group which may optionally be substituted by an alkoxy group containing from 1 to 6 carbon atoms, a phenoxy group, phenyl group, an amino, alkylamino or dialkylamino group or by one or more hydroxy groups; and in which $R_5$ is a hydrogen atom or an alkyl group containing from 1 to 6 carbon atoms and $R_6$ is an alkyl group containing from 1 to 6 carbon atoms); with the proviso that when X represents a carboxyl group $R_1$ and $R_2$ do not both represent hydrogen atoms; and pharmaceutically acceptable non-toxic salts and esters of such compounds.

These derivatives have pharmacological activity and in particular inhibit the release of spasmogen mediators from antigen-antibody reactions.

6 Claims, No Drawings

XANTHONE DERIVATIVES

This is a division, of application Ser. No. 90,444, filed Nov. 17, 1970.

This invention relates to novel xanthone derivatives, to processes for the preparation thereof, and to compositions containing such derivatives.

We have found that certain new xanthone derivatives have useful pharmacological activity and in particular inhibit the release of spasmogen mediators from antigen-antibody reactions.

Accordingly the present invention provides compounds of the general formula I

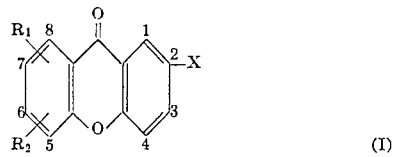

(I)

in which X represents a carboxyl or 5-[1H]-tetrazolyl group; and $R_1$ and $R_2$ which may be the same or different each represent a hydrogen atom, an alkyl group containing from 1 to 4 carbon atoms, a nitro group, a halogen atom or a group of the formula $-NR_3R_4$ or $OR_3$ or $NR_5SO_2R_6$, (in which the groups $R_3$ and $R_4$ which may be the same or different each represent a hydrogen atom, a phenyl group, a benzyl group or an alkyl group which may optionally be substituted by an alkoxy group containing from 1 to 6 carbon atoms, a phenoxy group, phenyl group, an amino, alkylamino or dialkylamino group or by one or more hydroxy groups; and in which $R_5$ is a hydrogen atom or an alkyl group containing from 1 to 6 carbon atoms and $R_6$ is an alkyl group containing from 1 to 6 carbon atoms); with the proviso that when X represents a carboxyl group $R_1$ and $R_2$ do not both represent hydrogen atoms; and pharmaceutically acceptable non-toxic salts and esters of such compounds.

Pharmaceutically acceptable non-toxic salts according to the invention may for example be salts of the group X with alkali metals, e.g., sodium, or with organic bases, for example dimethylaminoethanol and morpholine. Where $R_1$ and $R_2$ contain basic substituents the invention also provides non-toxic salts with acids, e.g., hydrochlorides.

Also included are esters of the carboxylic acid function (X = COOH) for example those with lower alkanols and glycerol.

Compounds according to the invention in which $R_1$ or $R_2$ represent alkyl are preferably those in which the alkyl groups contain from 1 to 4 carbon atoms. Similarly where $R_1$ or $R_2$ represent $-NR_3R_4$, $-OR_3$ or $NR_5SO_2R_6$ and $R_3$, $R_4$, $R_5$ and $R_6$ represent alkyl groups these are preferably ones which contain from 1 to 4 carbon atoms.

Specific preferred compounds are as follows:
7-Nitro-9-oxo-xanthene-2-carboxylic acid.
7-Amino-9-oxo-xanthene-2-carboxylic acid, hydrochloride.
6-Nitro-9-oxo-xanthene-2-carboxylic acid.
6-Methoxy-9-oxo-xanthene-2-carboxylic acid.
6-Propoxy-9-oxo-xanthene-2-carboxylic acid.
6-(2-Hydroxyethoxy)-9-oxo-xanthene-2-carboxylic acid.
6-(2-Hydroxypropoxy)-9-oxo-xanthene-2-carboxylic acid.
6-(2-Methoxyethoxy)-9-oxo-xanthene-2-carboxylic acid.
6-(2-Dimethylaminoethoxy)-9-oxoxanthene-2-carboxylic acid.
6-(Isopropoxy)-9-oxoxanthene-2-carboxylic acid.
6-[2(2-Hydroxyethoxy)ethoxy]-9-oxo-xanthene-2-carboxylic acid.
6-(2-Phenoxyethoxy)-9-oxo-xanthene-2-carboxylic acid.
6-(2Phenylethoxy)-9-oxo-xanthene-2-carboxylic acid.
6-Phenoxy-9-oxo-xanthene-2-carboxylic acid.
6-Benzyloxy-9-oxo-xanthene-2-carboxylic acid.
6-Methoxy-7-Nitro-9-oxo-xanthene-2-carboxylic acid.
5-Methoxy-9-oxo-xanthene-2-carboxylic acid.
7-Methyl-9-oxo-xanthene-2-carboxylic acid.
6,7-Dimethoxy-9-oxo-xanthene-2-carboxylic acid.
7-Methoxy-9-oxo-xanthene-2-carboxylic acid and sodium salt.
7-Dimethylamino-9-oxo-xanthene-2-carboxylic acid.
7-(N-Methylamino)-9-oxo-xanthene-2-carboxylic acid.
7-Hydroxy-9-oxo-xanthene-2-carboxylic acid and ethyl ester.
7-Amino-9-oxo-xanthene-2-carboxylic acid and methyl ester.
7-Methanesulphonamido-9-oxo-xanthene-2-carboxylic acid and methyl ester.
7-Dimethylamino-6-methoxy-9-oxo-xanthene-2-carboxylic acid.
7-Isopropoxy-9-oxo-xanthene-2-carboxylic acid.
7-(2-Hydroxyethoxy)-9-oxo-xanthene-2-carboxylic acid and sodium salt.
7-Chloro-9-oxo-xanthene-2-carboxylic acid.
6-Chloro-9-oxo-xanthene-2-carboxylic acid.
7-(N-Methyl-methanesulphonamido)-9-oxo-xanthene-2-carboxylic acid.
2-(1H-Tetrazol-5-yl)-xanthene-9-one.
6-(3-Hydroxypropoxy)-2-(1H-tetrazol-5-yl)-xanthene-9-one.
7-Dimethylamino-2-(1H-tetrazol-5-yl)-xanthene-9-one.
6,7-Dimethoxy-2-(1H-tetrazol-5-yl)-xanthene-9-one.
7-Methoxy-2-(1H-tetrazol-5-yl)-xanthene-9-one and sodium and morpholine salt.

The xanthone derivatives according to the invention have been shown to inhibit release of spasmogens from antigen-antibody reactions such as occur in the rat during the PCA (passive cutaneous anaphylaxis) test described by Ogilvie (J. Immunol., 1967, 12, (2), 113). Thus the compound of Example 24 when given intravenously was about five to seven times more potent than sodium cromoglycate in inhibiting the PCA reaction in sensitised rats challenged with *Nippostrongylis brasiliensis* as antigen. These compounds are therefore of value in the treatment of conditions in which extrinsic antigen combination with a reaginic antibody is primarily responsible, for example extrinsic asthma, hay fever, urticaria, eczema or atopic dermatitis.

The invention also provides pharmaceutical compositions which contain a xanthone derivative of general formula (I) or a salt or ester thereof together with a pharmaceutically acceptable carrier, excipient or other formulatory agent. The compositions may also contain supplementary medicinal agents, e.g., a bronchodilator, antihistamine, tranquilliser or anxiolytic. Forms for oral administration include tablets, capsules, syrups or emulsions.

For administration by inhalation the the compositions according to the invention may be in the form of a powder or snuff or as an aerosol spray presentation. The last may conveniently be a pressurised pack with a metering valve to deliver a fixed dosage unit or may be an aqueous solution that may be delivered via a nebuliser device.

The dosage at which the active ingredient is administered may vary within a wide range. A suitable oral dosage range is generally from 20–1,500 mg. and for inhalation is from 1–20 mg.

The invention also provides a process for the preparation of compounds of formula (I) in which acids of general formula (II) are cyclised to xanthones of general formula (III) where $R_7$, $R_8$, and Z may be the groups

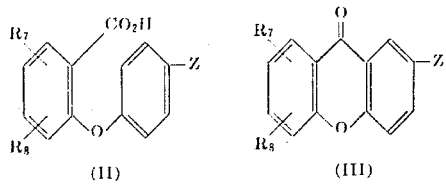

$R_1$, $R_2$ and X of formula (I) are herein defined or are groups that can be subsequently converted thereto by standard methods of chemistry well known to those skilled in the art, e.g., Z may be a methyl group which can then be oxidised to the carboxylic acid, or may be a nitrile which can be hydrolysed to the acid or can be converted into the 5-[1H]-tetrazolyl function. The cyclisation may be effected by heating with condensing agents such as sulphuric acid, phosphorus oxychloride, or polyphosphoric acid (PPA), for example at temperatures between 60° and 100°. Where Z represents a nitrile group this is converted by PPA under the cyclisation conditions into an amide and by sulphuric acid into a mixture of the amide and the acid. The amide can then be hydrolysed to the carboxylic acid with mineral acids or with alkali or it may be reconverted into the nitrile with dehydrating agents, e.g., by warming with tosyl chloride and pyridine in dimethylformamide.

Conversion of compounds where Z represents a nitrile function into those where Z represents a 5-[1H]-tetrazolyl group can be effected by treatment with hydrazoic acid or its salts. The reaction can conveniently be carried out with sodium or ammonium azide in an inert solvent, e.g., dimethylformamide, which may be warmed to about 100° C.

The intermediates of general formula (II) may be prepared by an Ullman reaction of the halo acid (IV) and a phenol (V).

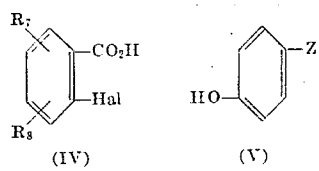

Hal represents a halogen atom, e.g., chlorine or bromine. The reaction can conveniently be carried out in the presence of an alkali metal carbonate such as potassium carbonate, cuprous iodide, and copper bronze at elevated temperatures, e.g., between 100° and 180° C. Inert high-boiling solvents such as xylene or nitrobenzene may also be present.

Compounds of general formula I where $R_1$ and $R_2$ are alkoxy may be prepared from an appropriate nitro or chloro xanthone carboxylic acid or nitrile of formula VI by direct displacement e.g., as shown below:

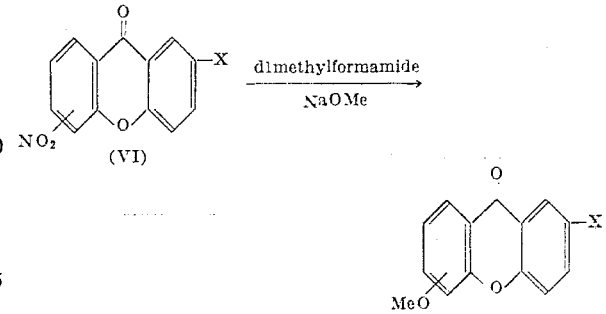

The nitro or chloro group is in the 6 or 8 position.

Compounds of general formula I wherein $R_1$ and/or $R_2$ represent amino groups may be prepared by reduction of the corresponding nitro compounds with, for example stannous chloride. When X is a protected carboxyl group, for example the group $CO_2CH_3$, the compounds of general formula I in which $R_1$ represents the group $NHSO_2R_6$ may be prepared by reaction of the appropriate amine with a suitable sulphonyl chloride, for example methane sulphonyl chloride. Further alkylation may be effected with a suitable alkylating agent, for example dimethylsulphate. The ester, $X = CO_2CH_3$ may be hydrolysed to the acid, $X = CO_2H$ by heating with sodium hydroxide.

In the case where $R_1$ and/or $R_2$ represent a group $OR_3$ an alternative to the direct alkoxide displacement referred to above is reaction of the compound in which $R_1$ and $R_2$ are hydroxyl and X is a protected carboxyl group with an alkyl halide and an alkali e.g., sodium hydride with subsequent hydrolysis of the protected group. Where $R_3$ in the group $-OR_3$ represents an alkyl radical substituted with hydroxyl such radical may be provided by reaction of the corresponding compound in which $R_1$ and/or $R_2$ represent $-OH$ with an alkylene oxide in particular ethylene oxide.

The compound in which $R_1$ and/or $R_2$ represent OH may be prepared from its corresponding compound in which $R_1$ and/or $R_2$ represent $OCH_3$ by heating with hydrogen bromide in acetic acid or aluminium chloride in xylene.

The following Examples illustrate the invention:

Example 1: 7-Nitro-9-oxo-xanthene-2-carboxylic acid

2-Chloro-5-nitro-benzoic acid (20 g.), p-cresol (20 g.), anhydrous potassium carbonate (1.4 g.), copper bronze (0.2 g.), and cuprous iodide (0.2 g.) were ground together and heated for 1 hour at 170°–175°. The mixture was cooled, triturated with water, and filtered. The filtrate was acidified with dilute hydrochloric acid and the precipitate was recrystallised from aqueous methanol (1:1) to give 5-nitro-2-(p-tolyloxy)-benzoic acid (5 g.), m.p. 166°–167°.

The above acid (30 g.) was heated at 95° C with concentrated sulphuric acid (200 ml.) for 1 hour and then poured onto ice and filtered. The filter-cake was suspended in water, treated with saturated aqueous sodium bicarbonate to pH6, and re-filtered. The product was recrystallised from acetic acid to give 2-methyl-7-nitro-xanthone (14.1 g.), m.p. 223.5° – 224° C.

The above xanthone (5 g.) in acetic acid — acetic anhydride (1:1) (200 ml.) was treated slowly at 60° C with chromic oxide (5 g.) in the same solvent mixture (100 ml.). After 9 hours at 70°–75° the mixture was poured into water (100 ml.) and the precipitate was recrystallised from glacial acetic acid to given 7-nitro-9-oxo-xanthene-2-carboxylic acid (3.5 g.), m.p. 318°.

Example 2: 7-Amino-9-oxo-xanthene-2-carboxylic acid

7-Nitro-9-oxo-xanthene-2-carboxylic acid (5 g.) from Example 1 was added over 0.5 hour to stannous chloride (30 g.) in concentrated hydrochloric acid (30 ml.) at 95° –100° C and the mixture was kept at this temperature for a further 2 hours. The precipitate was filtered off, washed with water, and stirred for 0.5 hours with 5N sodium hydroxide (175 ml.). The bright-yellow precipitate was filtered off, dried, and recrystallised from ethanol. Treatment with an excess of 2N-hydrochloric acid gave 7-amino-9-oxo-xanthene-2-carboxylic acid, hydrochloride (2.9 g.), m.p. > 400° C.

Example 3: 6-Nitro-9-oxo-xanthene-2-carboxylic acid

2-Chloro-4-nitro-benzoic acid (10 g.), 4-hydroxy benzonitrile (11.9 g.), potassium carbonate (10.5 g.) copper bronze (0.1 g.) and cuprous iodide (0.1 g.) were ground together and placed in an oil-bath at 130°. The temperature was raised to 170° and maintained at 170°–180° for 1.5 hours. The cooled melt was powdered and extracted with water and the extracts were acidified with hydrochloric acid. The precipitate was washed with hot water, dried and recrystallised first from aqueous ethanol and then from ethanol to give 2-(4-cyanophenoxy)-4-nitro-benzoic acid (4.8 g.), m.p. 185° C.

The above nitrile (4.6 g.) was refluxed in phosphorus oxychloride (50 ml.) for 3.5 hours and the solution was then poured cautiously onto crushed ice. The precipitate was washed with hot aqueous potassium carbonate and then with water and recrystallised from glacial acetic acid to give 6-nitro-9-oxo-xanthene-2-carbonitrile (2.15 g.), m.p. 285° – 287.5° C.

The nitrile (1.6 g.) was refluxed with sulphuric acid (16 ml.), acetic acid (16 ml.) and water (16 ml.), for 2 hours. The mixture was poured onto ice and the filtered product was recrystallised from glacial acid to give 6-nitro-9-oxo-xanthene-2-carboxylic acid (0.55 g.), m.p. 300° C.

Example 4: 6-Methoxy-9-oxo-xanthene-2-carboxylic acid

6-Nitro-9-oxo-xanthene-2-carboxylic acid (1 g.) from Example 3 in dimethylformamide (100 ml.) was heated at 80°–90° for 1.75 hours with sodium methoxide [from sodium (0.25 g.) and methanol (10.5 ml.)] and then poured onto ice (300 g.) and extracted with ethyl acetate (350 ml.). The aqueous phase was acidified with concentrated hydrochloric acid and chilled. The buff precipitate was filtered off and recrystallised from glacial acetic acid to give 6-methoxy-9-oxo-xanthene-2-carboxylic acid (0.45 g.), m.p. 331° – 334°.

The following 6-substituted-9-oxo-xanthene-2-carboxylic acids were prepared from the 6-nitro compound as described above by displacement with the appropriate alkoxide:

| | mp (°C) |
|---|---|
| 6-Propoxy- | 285 |
| 6-(2-Hydroxyethoxy)- | 280 |
| 6-(2-Hydroxypropoxy)- | 240 |
| 6-(2-Methoxyethoxy)- | 260 |
| 6-(2-Dimethylaminoethoxy)- | 286 (Hydrochloride) |
| 6-(Isopropoxy)- | 273 |
| 6-[2(2-Hydroxyethoxy)ethoxy]- | 235 |
| 6-(2-Phenoxyethoxy)- | 287 |
| 6-(2-Phenylethoxy)- | 230 |
| 6-Phenoxy- | 198–201 |
| 6-Benzyloxy- | 291–293 |

Example 5: 6-Methoxy-7-Nitro-9-oxo-xanthene-2-carboxylic acid

2-Chloro-4-nitrobenzoic acid was dissolved in nitric acid (sp.gr. 1.5, 30 ml.) and concentrated sulphuric acid (200 ml.) and the mixture was heated at 90°–95° for 10 minutes. An exothermic reaction then began and the temperature rapidly rose to 130°. The reaction mixture was cooled to 100° and kept at 90°–100° for 20 minutes, and then poured onto crushed ice. 2-Chloro-4,5-dinitrobenzoic acid separated as an off-white solid this was collected and dried, m.p. 162°–165° (46.8 g.).

A solution of potassium hydroxide (104.9 g.) in methanol (1 litre) was added over 10 minutes to 2-chloro-4,5-dinitrobenzoic acid (209.9 g.) in methanol (1 litre) stirred at 50°. The mixture was stirred at 50°–55° for 30 minutes. Water (2 litres) was then added and the yellow solution acidified. The methoxy acid was recrystallised from methanol to give needles, m.p. 239°–243° C (107.9 g.) m.p. 235° C.

A mixture of 2-chloro-5-nitro-4-methoxy-benzoic acid (10.0 g., 0.0432 mole) 4-hydroxybenzonitrile (11.6 g., 0.0973 mole), anhydrous potassium carbonate (6.8 g., 0.0493 mole), cuprous iodide (0.4 g.) and copper powder (0.4 g.) was intimately ground in a mortar and then placed in an oil bath at 140°. The temperature was raised to 150° over 15 minutes, and then maintained at this period for 1 ¼ hours. The yellowish-green melt was cooled and then taken up in water (1 litre). The solution was filtered to remove insoluble solids and acidified to pH 1. A faint yellow oil separated. This slowly crystallised, was collected and dried, m.p. 197°–212° C (8.65 g.). Recrystallisation from aqueous ethanol afforded light buff prisms. m.p. 216°–219° C (7.25 g.), of 2-(4-cyanophenoxy)-4-methoxy-5-nitrobenzoic acid.

A solution of 2-(4-cyanophenoxy)-4-methoxy-5-nitrobenzoic acid (2.0 g.) in phosphorus oxychloride (20 ml.) was boiled under reflux for 35 minutes. A light yellow solid separated during this period. The mixture was cooled and poured onto crushed ice. A faint yellow solid separated, was collected and dried, m.p. 335° – 337° C (dec.) (1.7 g.). Recrystallisation from dimethylformamide gave light yellow prisms, m.p. 339°–340° C (dec.), of 6-methoxy-7-nitro-9-oxo-xanthene-2-carbonitrile.

6-Methoxy-7-nitro-9-oxo-xanthene-2-carbonitrile (2.093 g.) was suspended in a solution of glacial acetic acid (20 ml.), water (20 ml.) and concentrated sulphuric acid (20 ml.) and the mixture was boiled under reflux for 6 hours. During this period the product separated as a white solid. Water 100 ml.) was added and the precipitated solid was collected, washed well with water and dried, m.p. 345.6° – 346° C (dec.) (2.012 g.). Recrystallisation from dimethylformamide afforded fine needles, m.p. 341° – 343° (dec.) (1.863 g.).

Example 6: 5-Methoxy-9-oxo-xanthene-2-carboxylic acid

2-Chloro-5-methyl-benzoic acid (9.2 g.), 2-methoxyphenol (7.57 g.), copper bronze (1 g.) were added to methanolic sodium methoxide [from sodium (2.78 g.) and methanol (50 ml.)]. The solvent was removed and the residue was placed in an oil bath at 140°. The temperature was then raised to 185°, nitrobenzene (25 ml.) added, and heating continued for 1.5 hours. The cooled mixture was threaded with an excess of aqueous potassium carbonate and extracted with ether.

The aqueous phase was adjusted to pH 8, filtered, and then acidified with hydrochloric acid. Recrystallisation of the precipitate from ethanol gave 2-(2-methoxy-phenoxy)-5-methylbenzoic acid (6.1 g.), m.p. 115°.

Potassium nermanganate (13.4 g.) and magnesium sulphate (3.7 g.) in hot water (220 ml.) was added over 1.5 hours to the above acid (6.1.g.) in refluxing 2N sodium carbonate. After a further hour the excess of permanganate was discharged with sodium bisulphite and inorganic salts were removed by filtration. The filtrate was acidified and the precipitate was recrystallised from ethanol to give 4-(2methoxyphenoxy)-isophthalic acid (5.2 g.), m.p. 237°–238° C.

This acid (5.2 g.) was stirred at 90°–100° C for 1.5 hours with polyphosphoric acid (79 g.) and poured into water (200 ml.). The precipitate was washed with water and recrystallised from ethanol to give 5-methoxy-9-oxo-xanthene-2-carboxylic acid (1.2 g.), m.p. 320° C.

Example 7: 7-Methyl-9-oxo-xanthene-2-carboxylic acid 2-(4-Cyano-phenoxy)-5-methylbenzoic acid, m.p. 172°, was obtained from 2-chloro-5-methyl-benzoic acid and 4-hydroxybenzonitrile using the method described in Example 6 for the preparation of 2-(2-methoxy-phenoxy)-5-methylbenzoic acid.

The cyano acid (4.7 g.) was refluxed for 1.5 hours with sulphuric acid (47 ml.), acetic acid (47 ml.), and water (47 ml.). The mixture was poured into water to give a precipitate of 5-methyl-2,4'-oxydibenzoic acid (4.5 g), m.p. 263°.

This di-acid (4.3 g.) was stirred at 90°–100° for 2.5 hours with polyphosphoric acid (57.3 g.) and then treated with water (50 ml.). The precipitate was washed with water and recrystallised from ethanol and then from acetone to give 7-methyl-9-oxo-xanthene-2-carboxylic acid (0.9 g.), m.p. 298° C.

Example 8: 6,7-Dimethoxy-9-oxo-xanthene-2-carboxylic acid 2-(4Cyanophenoxy)-4,5-dimethoxy-benzoic acid, m.p. 254°–255° C, was prepared from the Ullman reaction between 2-bromo-4,5-dimethoxybenzoic acid and 4-hydroxy benzonitrile using the conditions described in Example 6 for the synthesis of 2-(2-methoxyphenoxy)-5-methyl-benzoic acid.

The cyano-acid (1 g.) was heated at 90° – 100° for 25.5 hours with polyphosphoric acid (6 g.) and then poured onto ice. The precipitate was recrystallised from acetic acid to give 6,7-dimethoxy-9-oxo-xanthene-2-carboxamide (0.95 g.), m.p. 219°–222° C.

The preceding amide (0.5 g.) was heated at 90° – 95° for 27 hours, with ethanol (2.5 ml.) and 2N sodium hydroxide (2.5 ml.). The solution was acidified with concentrated hydrochloric acid and the precipitate was recrystallised from dimethylformamide to give 6,7-dimethoxy-9-oxo-xanthene-2-carboxylic acid (0.32 g.), m.p. > 300° C.

Example 9: 7-Methoxy-9-oxo-xanthene-2-carboxylic acid

Method A: 2-Chloro-5-nitro-benzoic acid (156 g.) in n-pentanol (600 ml.) and p-methoxyphenol (110 g.) were refluxed with stirring for 4 hours with anhydrous potassium carbonate (240 g.), copper bronze (0.8 g.) and cuprous iodide (0.8 g.). The cooled mixture was treated with ether and water and the aqueous phase was further extracted with ether and then acidified with dilute hydrochloric acid.

Extraction with ethyl acetate and dilution of the organic extracts with light petroleum (bp 40°–80° C) gave a fawn solid which on recrystallisation from ethanol gave 2-(4-methoxyphenoxy)-5-nitro-benzoic acid (75 g.), m.p. 141.5° C.

This acid (75 g.) was cyclised with sulphuric acid by the method described in Example 1 for 5-nitro-2-(p-tolyloxy)-benzoic acid, to give 7-methoxy-2-nitro-xanthone (37.2 g.), m.p. 211°–212.5°C after crystallisation from ethyl acetate/methanol.

The nitro group was reduced to the primary amine with stannous chloride using the method described in Example 2. 7-Methoxy-2-amino-xanthone, m.p. 181°, was obtained by crystallisation from aqueous ethanol.

This amine (1.8 g.), suspended in concentrated hydrochloric acid (5 ml.) and water (10 ml.), was treated dropwise at below 5° C with 10 percent sodium nitrite (5 ml.). After 10 minutes the mixture was added to a vigorously boiling solution of nickel chloride hexahydrate (3 g.) and sodium cyanide (3 g.) in water (30 ml.). After 0.5 hour reflux, the mixture was cooled and filtered. The filter cake was washed well with water and then refluxed for 5 hours with sulphuric acid (25 ml.), acetic acid (25 ml.) and water (25 ml.). The mixture was poured into water and filtered. The cake was taken up in an excess of 8 percent sodium bicarbonate, filtered, and reprecipitated by acidification with hydrochloric acid. Recrystallisation from water acetic acid (1:5) gave 7-methoxy-9-oxo-xanthene-2-carboxylic acid (0.65 g.), m.p. 297°–297.5° C.

Method B: 2-Bromo-5-methoxybenzoic acid (924 g.), potassium carbonate (818 g.), copper bronze (16 g.), cuprous iodide (16 g.), and xylene (4 l) were stirred at 80° and 4-hydroxybenzonitrile (476 g.) was added over 10 minutes. The temperature was raised to 130° C for 3 hours during which time an azeotrope of water (200 ml.) and xylene was collected. The mixture was cooled to 100° C and water (3 l.) was added. After filtration through Hyflo the xylene layer was washed with water (2 l.). The combined aqueous phases were slowly added to vigorously stirred concentrated hydrochloric acid (1,200 ml.). The solid was collected, washed with water, slurried with hot water, and filtered hot to give crude 2-(4-cyanophenoxy)-5-methoxy-benzoic acid (780 g.), m.p. 154°–155° C. Recrystallisation from aqueous ethanol gave material m.p. 171°–172° C.

The above nitrile (100 g.) and concentrated sulphuric acid (300 ml.) were heated at 90°–100° C for 0.5 hours. Acetic acid (200 ml.) and water (300 ml.) were added and the mixture was fluxed for 4 hours and poured into water (1 l.). The precipitate was recrystallised from dimethylformamide to give 7-methoxy-9-oxo-xanthene-2-carboxylic acid (52 g.), m.p. 301°–302°.

The above acid (48 g.) was stirred with water (250 ml.) at 90° and dimethylaminoethanol (17.5 g.) was added. The solution was added to sodium hydroxide (7.25 g.) in water (35 ml.). Ethanol was added and the precipitate was washed with ethanol and dried at 50° C to give the sodium salt, monohydrate, of the acid.

Method C: 2-(4-Cyanophenoxy)-5-methoxy-benzoic acid (400 g.) (Method B above) and polyphosphoric acid (160 g.) was heated for 2 hours at 90°–100° C. Acetic acid (150 ml.) was added and the mixture poured into water (4 l.)., keeping the temperatures below 45° C. The solid was washed well with water and then with ethanol and dried at 60° to give 7-methoxy-9-oxo-xanthene-2-carboxamide (358 g.), m.p. 280°–290° C. Crystallisation from aqueous acetic acid gave material m.p. 301°–303° C.

The above carboxamide (10 g.) was refluxed for 4 hours in water (30 ml.), glacial acetic acid (30 ml.), and concentrated sulphuric acid (30 ml.). The mixture was cooled and filtered to give 7-methoxy-9-oxo-xanthene-2-carboxylic acid (9 g.), m.p. 296°–299° C.

Example 10:
7-Dimethylamino-9-oxo-xanthene-2-carboxylic acid

2-Chloro-5-nitro-benzoic acid (10 g.) and p-hydroxy benzonitrile (11.9 g.) were condensed, using the method described in Example 1 for 5-nitro-2-(p-tolyoxy)-benzoic acid, to give 2-(4-cyanophenoxy)-5-nitro-benzoic acid (6.1 g.), m.p. 180°–182.5°, after crystallisation from aqueous ethanol.

The above acid (48.8 g.) was cyclised with phosphorus oxychloride, as described in Example 3 for 6-nitro-9-oxo-xanthene-2-carbonitrile, to give 7-nitro-9-oxo-xanthene-2-carbonitrile, m.p. 315°–319°.

This nitro compound (3 g.) was reduced to the primary amine with stannous chloride, as described in Example 2 for 7-amino-9-oxo-xanthene-2-carbonitrile (1.6 g.), m.p. 271°–276°.

The above amine (1.5 g.) in dioxan (10 ml.) was treated with ionic acid (12. ml.) and formaldehyde (37 percent) (1.65 g.) at room temperature and then heated at 95°–100° C for 5 hours. On cooling to 0° C a solid separated that was purified by elution from a column of alumina with 5 percent ethyl acetate benzene. Recrystallisation from ethanol gave 7-dimethylamino-9-oxo-xanthene-2-carbonitrile (0.49 g.).

This nitrile (0.42 g.) was hydrolysed with water-sulphuric acid-acetic acid, as described in Example 3 for 6-nitro-9-oxo-xanthene-2-carboxylic acid, to give 7-dimethylamino-9-oxo-xanthene-2-carboxylic acid (0.37 g.), m.p. 280°–281.5° C, after crystallisation from ethanol.

Example 11:
7-(-N-Methylamino)-9-oxo-xanthene-2-carboxylic acid 7-(N-Methyl-methanesulphonamido)-9-oxo-xanthene-2-carboxylic acid, methyl ester (290 mg.) was heated under reflux with stirring in glacial acetic acid (2.9 ml.), concentrated sulphuric acid (2.9 ml.) and water (2.9 ml.) for 2 ¼ hours. The brown solution was left to cool, then added to ice and cooled in an ice bath. The precipitate was filtered off and recrystallised from aqueous dimethylformamide. Yield: 176 mg. m.p. 274.5°–276° C.

Example 12: 7-Hydroxy-9-oxo-xanthene-2-carboxylic acid

7-Methoxy-9-oxo-xanthene-2-carboxylic acid (0.6 g.), aluminum chloride (2.4 g.) and xylene (20 ml.) were heated at 65°–75° C for 5 hours and poured onto crushed ice (50 g.) anc concentrated hydrochloric acid (15 ml.). The precipitate was filtered off, taken up in 8 percent sodium bicarbonate, refiltered and recovered by acidification with hydrochloric acid. The product was extracted into ethyl acetate and the extracts were washed and evaporated. Crystallisation of the residue from ethyl acetate gave 7-hydroxy-9-oxo-xanthene-2-carboxylic acid (0.2 g.), m.p. 349° C (d).

Example 13: 7-Amino-9-oxo-xanthene-2-carboxylic acid methyl ester.

7-Amino-9-oxo-xanthene-2-carboxylic acid, hydrochloride (12.2 g.), from Example 2, was refluxed for 16 hours in methanol (1,600 ml.) and sulphuric acid (61 ml.) and then poured onto crushed ice. The precipitate was filtered off, triturated with 2N sodium hydroxide, refiltered, and dried to give the methyl ester (9.4 g.), m.p. 252°–254° C.

Example 14:
7-Methanesulphonamido-9-oxo-xanthene-2-carboxylic acid.

7-Amino-9-oxo-xanthene-2-carboxylic acid, methyl ester (4 g.), from Example 13, pyridine (150 ml.), and methanesulphonyl chloride (1.28 ml.) were stirred for 6 days at room temperature and then for 24 hours at 40° C. A further portion (1.05 ml.) of methanesulphonyl chloride was added and heating continued for 5.5 hours. The mixture was poured onto ice and the precipitate was crystallised from aqueous acetone to give 7-methanesulphonamido-9-oxo-xanthene-2-carboxylic acid, methyl ester (3.5 g.), m.p. 274°–276° C.

The above ester (0.3 g.), sodium hydroxide (0.076 g.), water (6 ml.) and ethanol (3 ml.) were refluxed for 6 hours. The mixture was diluted, acidified with concentrated hydrochloric acid and chilled. The precipitate was recrystallised from dimethylformamide to give 7-methanesulphonamido-9-oxo-xanthene-2-carboxylic acid (0.27 g.), m.p. 321° (d).

Example 15:
7-Dimethylamino-6-methoxy-9-oxo-xanthene-2-carboxylic acid

2-Chloro-4-methoxy-5-nitro-benzoic acid (10 g.) and 4-hydroxybenzonitrile (11.6 g.) were condensed, using the method described in Example 1 for 5-nitro-2-(p-tolyoxy) benzoic acid, to give 2-(4-cyanophenoxy)-4-methoxy-5-nitro-benzoic acid (7.25 g.), m.p. 216°–219°, after crystallisation from aqueous ethanol.

This acid (2 g.) was cyclised with phosphorus oxychloride as described in Example 3 for 6-nitro-9-oxo-xanthene-2-carbonitrile, to give 6-methoxy-7-nitro-9-oxo-xanthene-2-carbonitrile (1.7 g.), m.p. 339°–340° C (d), after crystallisation from dimethylformamide.

The above nitrile (40 g.) was reduced with stannous chloride, as described in Example 2 for 7-Amino-9-oxo-xanthene-2-carboxylic acid, to give 6-methoxy-7-amino-9-oxo-xanthene-2-carbonitrile (26.9 g.), m.p. 340° C (d), after crystallisation from dimethylformamide.

This amine (2 g.) was treated with formic acid and formalin as described in Example 10 for 7-dimethylamino-9-oxo-xanthene-2-carbonitrile. The reaction solution was concentrated and the precipitate was purified by elution from a column of alumina with 5–10 percent acetate/benzene to give 7-dimethylamino-6-methoxy-9-oxo-xanthene-2-carbonitrile (0.94 g.), m.p. 224°–227° C, after crystallisation from methylene chloride ethanol.

The above nitrile (0.7 g.) was refluxed for 2 hours in acetic acid (10 ml.), sulphuric acid (10 ml.), and water (10 ml.). The solution was diluted with water (100 ml.) and adjusted to pH4 with 2N sodium hydroxide. The precipitate was collected and recrystallised from aqueous dimethylformamide to give 7-dimethylamino-6-methoxy-9-oxo-xanthene-2-carboxylic acid (0.66 g.), m.p. 292°–294° C.

Example 16:
7-Isopropoxy-9-oxo-xanthene-2-carboxylic acid

7-Hydroxy-9-oxo-xanthene-2-carboxylic acid (7 g.) from Example 12 in dry ethanol (700 ml.) was refluxed for 5 hours with dry hydrogen chloride, then cooled, and diluted with water (110 ml.). The precipitate was crystallised from ethanol to give the ethyl ester (4 g.), m.p. 230° C.

This ester (0.5 g.) and sodium hydride (50 percent dispersion in oil) (0.3 g.) were stirred in dimethylformamide for ten minutes and isopropyl iodide (3 ml.) was added. After a further ten minutes the excess of hydride was decomposed with water and the solution was allowed to stand for 1 hour. The mixture was acidified and the precipitate was crystallised from ethanol to give 7-isopropoxy-9-oxo-xanthene-2-carboxylic acid (0.22 g.), m.p. 269°–270° C.

Example 17:
7-(2-Hydroxyethoxy)-9-oxo-xanthene-2-carboxylic acid

7-Hydroxy-9-oxo-xanthene-2-carboxylic acid, ethyl ester (1 g.), from Example 16, dimethylformamide (10 ml.), ethylene oxide (5 ml.), and pyridine (one drop) were heated in a sealed tube at 100° for 16 hours and then poured into water. The precipitate was refluxed for 2 hours with sodium hydroxide (1 g.) ethanol (250 ml.), and water (10 ml.) and the solution was cooled and acidified. The solid was crystallised from ethanol to give 7-(2-hydroxyethoxy)-9-oxo-xanthene-2-carboxylic acid (0.19 g.), m.p. 263°–265° C.

7-(2-Hydroxyethoxy)-9-oxo-xanthene-2-carboxylic acid Sodium salt.

10 percent sodium hydroxide solution (1.9 ml.) was added to a suspension of 7-(2-hydroxyethoxy)-9-oxo-xanthene-2-carboxylic acid (1.5 g.) in water (10 ml.). The solution was heated to 70° C and hot ethanol was added. The mixture was allowed to cool to give a crystalline sodium salt. It was filtered off, washed with ethanol and dried at 50° C, to give the sodium salt (1.4 g.).

Example 18: 7-Chloro-9-oxo-xanthene-2-carboxylic acid 2,5-Dichlorobenzoic acid (23.5 g.), potassium carbonate (23 g.), cuprous iodide (0.1 g.), copper bronze (0.1 g.), 4-hydroxybenzonitrile (21.6 g.), and nitrobenzene (105 ml.) were heated at 160° for 12 hours. The mixture was diluted with water and ether and the organic phase was extracted with 2N sodium hydroxide. The alkaline extracts were acidified with hydrochloric acid and the oil that separated was allowed to stand until the unchanged 4-hydroxy-benzonitrile crystallised, leaving the crude 5-chloro-2-(4-cyanophenoxy)-benzoic acid.

The crude acid was cyclised with polyphosphoric acid, as described in Example 9, Method C, for 7-methoxy-9-oxo-xanthene-2-carboxamide, to give crude 7-chloro-9-oxo-xanthene-2-carboxamide which was used in the next stage.

The crude amide (0.5 g.) was refluxed for 7 days in acetic acid (50 ml.) and 2N sulphuric acid (4 ml.). The mixture was diluted with water and the precipitate was crystallised from acetic acid to give 7-chloro-9-oxo-xanthene-2-carboxylic acid (0.05 g.), m.p. 349.5° C (d).

The 6-chloro compound may be prepared in a similar manner m.p. 164.8° C.

Example 19:
7-(N-Methyl-methanesulphonamido)-9-oxo-xanthene-2-carboxylic acid.

7-Methanesulphonamido-9-oxo-xanthene-2-carboxylic acid, methyl ester (2.93 g.) (Example 14) and dimethyl sulphate (2.4 ml.) were stirred for 5 hours with N sodium hydroxide (18.6 ml.). The solid was filtered off, washed with water, and extracted twice with dilute sodium carbonate. Acidification of the alkaline extracts and crystallisation from aqueous acetic acid gave 7-(N-methyl-methane-sulphonamido)-9-oxo-xanthene-2-carboxylic acid (0.76 g.), m.p. 262.5° – 263.5° C.

Example 20: 2-(1H-Tetrazol-5-yl)-xanthene-9-one a. 4-Cyanophenol (25 g.), 2-chlorobenzoic acid (36.7 g.), copper bronze (0.35 g.) and cuprous iodide (0.35 g.) were added to methanol (200 ml.) containing sodium (10.7 g.). The solvent was removed in vacuo and the residue heated at 185° for 10 minutes. Boiling nitrobenzene (42 ml.) was added and the temperature maintained at 180°–190° for 3 hours. It was cooled and the solid residue dissolved in dilute potassium carbonate solution (500 ml.), filtered, washed with ether and acidified to ca pH6. The solution was clarified by treatment with charcoal and acidified to pH 1. The solid was filtered off and crystallised from aqueous ethanol to give 2-(4-cyanophenoxy)-benzoic acid (23.5 g.) m.p. 138°–139°. (hemi alcoholate)

2-(4-Cyanophenoxy)-benzoic acid (2.39 g.), sodium azide (0.72 g.) and ammonium chloride (0.59 g.) in dimethylformamide (20 ml.) were heated at 100° for 26 hours. The mixture was cooled, filtered, and the solvent removed in vacuo. The residual oil was dissolved in dilute sodium bicarbonate solution, acidified, and precipitated solid filtered off and crystallised from aqueous ethanol to give 2-[4-(1H-tetrazol-5-yl)-phenoxy]benzoic acid (1.2 g.) m.p. 219°–221°.

2-[4-(1H-tetrazol-5-yl)-phenoxy]benzoic acid (0.5 g.) in concentrated sulphuric acid (3 ml.) was heated at 100° for 2.95 hours, cooled and poured onto ice. The precipitated solid was filtered off and crystallised from dimethylformamide to give the xanthone (0.16 g.) m.p. > 400°.

b. 2-[4-(1H-tetrazol-5-yl)-phenoxy]benzoic acid (0.5 g.) in polyphosphoric acid (3 g.) was heated at 100° for 5.25 hours, cooled and diluted with water. The precipitated solid was filtered off and crystallised from dimethylformamide to give the xanthone (0.24 g.) m.p. > 400°.

Example 21:
6-(3-Hydroxypropoxy)-2-(1H-tetrazol-5-yl)xanthone

6-Nitro-9-oxo-xanthene-2-carbonitrile (4.5 g.) (Example 3) was stirred at room temperature for 3.5 hours with a solution of sodium (1.2 g.) in propane-1,3-diol (51 ml.), then poured into water (700 ml.) and extracted with ethyl acetate (1,500 ml.). The organic extracts were evaporated and the residue poured onto ice. Crystallisation of the precipitate from aqueous ethanol and then from ethanol gave 6-(3-hydroxypropoxy)-9-oxo-xanthene-2-carbonitrile (3.35 g.), m.p. 170°–171.5°.

This nitrile (1.5 g.), sodium azide (0.37 g.) ammonium chloride (0.3 g.) and dimethylformamide were heated at 100° for 7.5 hours then poured onto ice. The mixture was extracted with ethyl acetate and the aqueous phase was acidified with concentrated hydrochloric acid and cooled to 0° C. The precipitate was crystallised from dimethylformamide to give 6-(3-hydroxypropoxy)-2-(1H-tetrazol-5-yl)-xanthone (1.2 g.) m.p. 280° C.

Example 22:
7-Dimethylamino-2-(1H-tetrazol-5-yl)-xanthone

7-Dimethylamino-9-oxo-xanthene-2-carbonitrile (0.24 g.) (Example 10), sodium azide (0.06 g.), ammonium chloride (0.05 g.) and dimethylformamide (4 ml) were heated at 100° for 40 hours and then evaporated to dryness. The residue was taken up in warm dilute sodium bicarbonate and filtered. The filtrate was acidified with concentrated hydrochloric acid and cooled to 0° C. The precipitated solid was filtered off and crystallised twice from aqueous ethanol to give 7-dimethylamino-2-(1H-tetrazol-5-yl)-xanthone (0.1 g.), m.p. 267°–269.5° C.

Example 23:
6,7-Dimethoxy-2-(1H-tetrazol-5-yl)-xanthone 6,7-Dimethoxy-9-oxo-xanthene-2-carboxamide (1 g.) (Example 8), tosyl chloride (1.4 g.), pyridine (1.38 ml.), and dimethylformamide (25 ml.) were warmed to 75°–80° C for 3 hours and then poured onto crushed ice. The precipitate was crystallised from ethanol to give 6,7-dimethoxy-9-oxo-xanthene-2-carbonitrile (0.67 g.).

The nitrile (0.5 g.) was treated with sodium azide, as described in Example 22 for 7-dimethylamino-2-(1H-tetrazol-5-yl)-xanthone, to give 6,7-dimethoxy-2-(1H-tetrazol-5-yl) xanthone (0.38 g.), m.p. > 300°, after crystallisation from aqueous dimethylformamide.

Example 24: 7-Methoxy-2-(1H-tetrazol-5-yl)-xanthone

7-Methoxy-9-oxo-xanthene-2-carboxamide (285 g.) (Example 9, Method C), tosyl chloride (304 g.), pyridine (1,150 ml.), and dimethylformamide (1,150 ml.) were heated at 100° for 5 hours and then poured onto crushed ice (3 Kg.). The slurry was acidified with concentrated hydrochloric acid. The precipitate was washed with water (2 × 1 l.) and dried at 50° C. Crystallisation from dimethylformamide gave 7-methoxy-9-oxo-xanthene-2-carbonitrile (202 g.), m.p. 255°–258° C.

The above nitrile (225 g.), ammonium chloride (55 g.) sodium azide (65 g.), and dimethylformamide (160 ml.) were heated for 6 hours at 115° C and then poured into water (2 l.) containing concentrated hydrochloric acid. The precipitate was crystallised from dimethylformamide to give 7-methoxy-2-(1H-tetrazol-5-yl)-xanthone (190 g.), m.p. 282°–283° C.

The above tetrazole (190 g.) was dissolved in warm water (800 ml.) which contained morpholine (62 ml.) and the solution was added to sodium (16.1 g.) in ethanol (450 ml.).

Ethanol (1.5 l.) was added and the precipitate was washed with ethanol and dried at 45° C to give the sodium salt, trihydrate (159 g.).

The tetrazole (127.5 g.) was dissolved in water (450 ml.) containing morpholine (39.5 g.) by warming on the steam bath. Acetone (500 ml.) was added and the solid that crystallised was washed with acetone and dried to give the tetrazole, morpholine salt (99 g.), m.p. 285°–288° C.

Example 25

Capsules

To prepare 5,000 capsules each containing 10 mg. of the compound of Example 24 (referred to as the active ingredient).

Mix 50 g. of finely powdered active ingredient together with sufficient microcrystalline cellulose to fill a No. 1 hard gelatin capsule so that each capsule contains 10 mg. of active ingredient.

Aerosols

An inhalation aerosol may be prepared containing in each metered dose 2 mg. of active ingredient made to the following formula:

| | |
|---|---|
| Active ingredient Sodium Salt, monohydrate | 2.25 mg. |
| Emulsifier YN | 0.075 mg. |
| Propellant 11 | 23.10 mg. |
| Propellant 12 | 59.30 mg. |

The active ingredient Sodium Salt is micronised and mixed with the propellant 11 together with the Emulsifier YN. The required quantity of this suspension is filled into an aerosol can and a suitable metering valve crimped in place. The propellant 12 is filled into the can through the valve.

Example 26

Capsules

To prepare 5,000 capsules each containing 10 mg. of the compound of Example 9 (active ingredient).

Mix 50 g. of finely powdered active ingredient together with sufficient microcrystalline cellulose to fill a No. 1 hard gelatin capsule so that each capsule contains 10 mg. active ingredient.

Aerosols

An inhalation aerosol may be prepared containing in each metered dose 2 mg. of active ingredient made to the following formula:

| | |
|---|---|
| Active ingredient Sodium Salt, trihydrate | 2.6 mg. |
| Emulsifier YN | 0.075 mg. |
| Propellant 11 | 23.10 mg. |
| Propellant 12 | 59.30 mg. |

The active ingredient sodium salt is micronised and mixed with the propellant 11 together with the Emulsifier YN. The required quantity of this suspension is filled into an aerosol can and a suitable metering valve

What is claimed is:

1. A compound of the formula

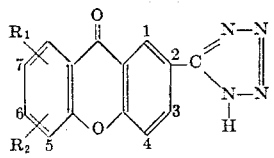

in which $R_1$ and $R_2$ are each H; alkyl of 1 to 4 C atoms; nitro; halo; hydroxy; phenoxy; alkoxy of 1 to 4 C atoms; alkoxy of 1 to 4 C atoms substituted by hydroxy, alkoxy of 1 to 6 C atoms, 2-hydroxyethoxy, phenoxy, phenyl or dialkylamino in which each alkyl radical is of 1 to 4 C atoms; amino; monoalkylamino of 1 to 4 C atoms; dialkylamino and in which each alkyl radical is of 1 to 4 C atoms; alkanesulphonamido of 1 to 6 C atoms or N-alkyl-substituted alkanesulphonamido in which the N-alkyl substituent and alkane moiety are of 1 to 6 C atoms; or a pharmaceutically acceptable non-toxic salt or lower alkyl or glyceryl ester thereof.

2. A compound as claimed in claim 1 which is 2-(1H-Tetrazol-5-yl)-xanthene-9-one.

3. A compound as claimed in claim 1 which is 6-(3-Hydroxypropoxy)-2-(1H-tetrazol-5-yl)-xanthene-9-one.

4. A compound as claimed in claim 1 which is 7-Dimethylamino-2-(1H-tetrazol-5-yl)-xanthene-9-one.

5. A compound as claimed in claim 1 which is 6,7-Dimethoxy-2-(1H-tetrazol-5-yl)-xanthene-9-one.

6. A compound as claimed in claim 1 which is 7-Methoxy-2-(1H-tetrazol-5-yl)-xanthene-9-one or its sodium or morpholine salt.

* * * * *